(12) United States Patent
Katsumata et al.

(10) Patent No.: US 7,963,648 B2
(45) Date of Patent: Jun. 21, 2011

(54) ORIGINAL COVER CLOSER

(75) Inventors: Tsutomu Katsumata, Osaka-hu (JP); Hirohumi Kohda, Osaka-hu (JP)

(73) Assignee: Simotec Inc., Osaka-Hu (JP)

( * ) Notice: Subject to any disclaimer, the term of this patent is extended or adjusted under 35 U.S.C. 154(b) by 798 days.

(21) Appl. No.: 11/955,942

(22) Filed: Dec. 13, 2007

(65) Prior Publication Data

US 2009/0153833 A1 Jun. 18, 2009

(51) Int. Cl.
*B41J 29/13* (2006.01)
(52) U.S. Cl. .................................. 347/108
(58) Field of Classification Search .......... 347/108, 347/2; 400/124.14, 124.16; 399/114, 380
See application file for complete search history.

(56) References Cited

U.S. PATENT DOCUMENTS

2009/0154974 A1* 6/2009 Katsumata et al. ........... 399/380
* cited by examiner

*Primary Examiner* — K. Feggins

(74) *Attorney, Agent, or Firm* — Browdy and Neimark, PLLC

(57) ABSTRACT

An original cover closer of which the energy absorption capability can be freely adjusted by a damper is described. The development period for the original cover closer is therefore shortened. The original cover closer comprises: an attachment member to be mounted on the main body of a device; a support member pivotally connected to the attachment member and operable to support an original cover; a first and a second slider slidably installed in the support member; a compression coil spring interposed between the first and second sliders and operable to urge the original cover to open; and a fluid damper located in the compression coil spring. Particularly, the fluid damper comprises: a cylinder having a base end fixed to the first slider; a piston slidably installed in the cylinder; an abutment stem integrally provided on the piston and located in order that a tip portion of the abutment stem can come in contact with the second slider; a first fluid chamber formed on one side of the piston; a second fluid chamber formed on the other side of the piston; a viscous fluid with which the first fluid second fluid chambers are filled; a fluid conduit formed through the piston in order that the viscous fluid can move through the fluid conduit from the first fluid chamber to the second fluid chamber and vice versa; and a flow rate regulating needle valve formed in the fluid conduit and operable to adjust the speed of the viscous fluid passing through the fluid conduit when the piston slides in the cylinder.

2 Claims, 4 Drawing Sheets

ORIGINAL COVER CLOSER

BACKGROUND OF THE INVENTION

1. Field of the Invention

The present invention relates to an original cover closer for use in a copying machine, a facsimile machine, a scanner or a multifunctional device thereof and the like.

2. Description of the Background Art

A conventional type of this original cover closer includes a mounting member which is mounted on the main body of a copying machine, a supporting member which is pivotally mounted on the mounting member and supporting an original cover, a first and a second slider which are slidably housed in the support member, a compression coil spring which is placed between these sliders and urged in the direction to open the original cover, and a fluid damper which is interposed between the attachment member and the support member and can operate only when the open angle of the support member is no smaller than a predetermined closing angle (for example, as described in Japanese Utility Model Registration Publication No. 2589714).

For example, in the case of the damper device disclosed in the Japanese Utility Model Registration Publication, the energy absorption capability of the damper is constant as illustrated in FIG. 4A, and thereby it is necessary to provide a damper having an appropriate energy absorption capability suitable for the weight of the original cover (ADF).

This requirement decreases the productivity while pushing up the cost.

SUMMARY OF THE INVENTION

It is an object of the present invention to provide an original cover closer of which the energy absorption capability can be adjusted by a damper.

It is another object of the present invention to shorten the development period for an original cover closer.

In order to accomplish the above mentioned objects, the original cover closer of the present invention comprises: an attachment member to be mounted on the main body of a device; a support member pivotally connected to the attachment member and operable to support an original cover; a first and a second slider slidably installed in the support member; a compression coil spring interposed between the first and second sliders and operable to urge the original cover to open; and a fluid damper located in the compression coil spring. Particularly, the fluid damper comprises: a cylinder having a base end fixed to the first slider; a piston slidably installed in the cylinder; an abutment stem integrally provided on the piston and located in order that a tip portion of the abutment stem can come in contact with the second slider; a first fluid chamber formed on one side of the piston; a second fluid chamber formed on the other side of the piston; a viscous fluid with which the first fluid second fluid chambers are filled; a fluid conduit formed through the piston in order that the viscous fluid can move through the fluid conduit from the first fluid chamber to the second fluid chamber and vice versa; and a flow rate regulating needle valve formed in the fluid conduit and operable to adjust the speed of the viscous fluid passing through the fluid conduit between the first fluid chamber and the second fluid chamber when the piston slides in the cylinder. In one preferred embodiment, the fluid conduit may be formed to extend into the abutment stem, and the flow rate regulating needle valve is located in the abutment stem.

In another preferred embodiment, the abutment stem may be provided with an opening through which the position of the flow rate regulating needle valve can be adjusted.

In accordance with the original cover closer of the present invention, there is an advantage that, even if the weight of an original cover or the like varies, it is possible to adjust the energy absorption capability by a damper as illustrated in FIG. 4B, and also an advantage that the cover closer can be developed in a short period.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

BEST MODE FOR CARRYING OUT THE INVENTION

Figure 1:
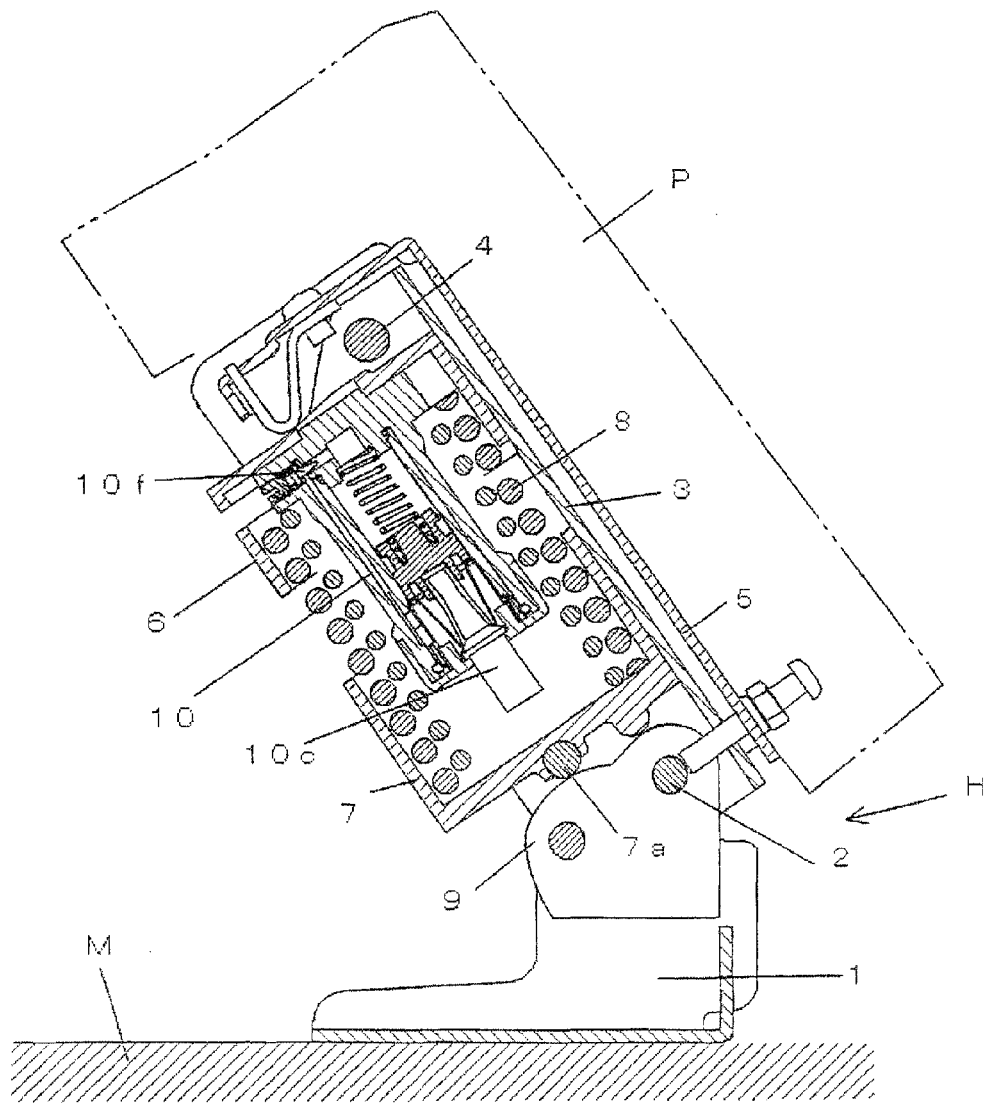
FIG. 1 is a cross sectional view for showing an original cover closer in accordance with an embodiment of the present invention.

In FIG. 1, an original cover P is mounted on the main body M of a copying machine or the like through a cover closer H such that it can be freely opened and closed. The cover closer H is composed mainly of a mounting member 1 which is mounted on the main body M, a support arm 3 which is pivotally attached to the mounting member 1 through a hinge shaft 2, and a lift arm 5 which is pivotally attached to the end of the support arm 3 through a support shaft 4 and to which the original cover P is fixedly attached.

A first slider 6 and a second slider 7 are disposed in the support arm 3 such that they can slidably move in the longitudinal direction, and a compression coil spring 8 is inserted between the first and second sliders 6 and 7. In the case of the present embodiment, the compression coil spring 8 is a double coil spring. However, the present invention is not limited thereto. The second slider 7 is provided with a cam follower 7a abutting on the cam portion 9 which is mounted on the attachment member 1.

Incidentally, the cover closer H according to the present invention is not limited to the structure as described above, but can be any one of known structures, for example, a structure in which the support shaft 4 and the lift arm 5 are not used and the original cover P is fixedly attached to the support arm 3.

Figure 2A:
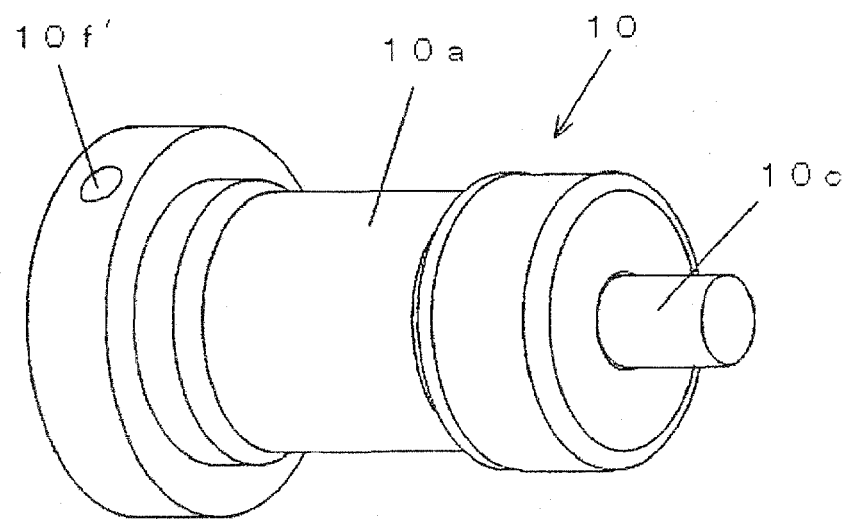
FIG. 2A is an external view for showing a fluid damper shown in FIG. 1.
Figure 2B:
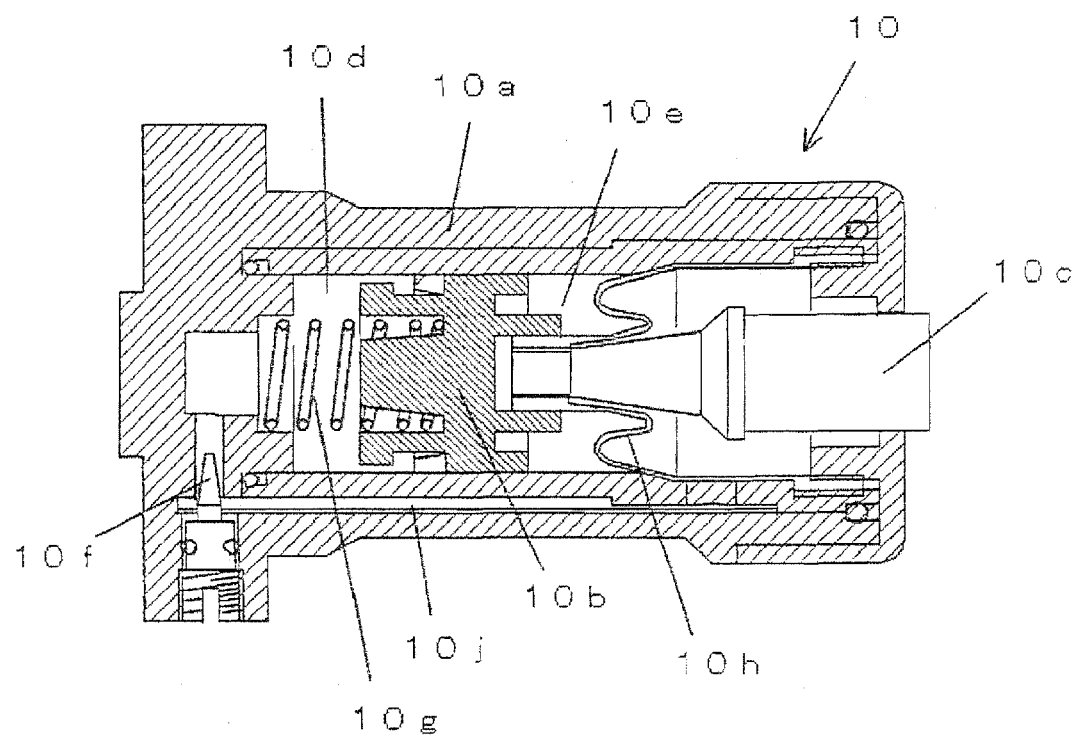
FIG. 2B is an expanded cross sectional view for showing the fluid damper shown in FIG. 1.

A fluid damper 10 is composed mainly of a cylinder 10a, a piston 10b, an abutment stem 10c, a first fluid chamber 10d, a second fluid chamber 10e, a flow rate regulating needle valve 10f, a coil spring 10g and a diaphragm 10h as illustrated in FIG. 2. The base end of the cylinder 10a is fixedly mounted on the first slider 6 as described above. On the other hand, the tip portion of the abutment stem 10c is installed such that it can come in contact with the second slider 7. When the sliders 6 and 7 are located apart from each other as illustrated in the figure, the tip portion of the abutment stem 10c is located away from the second slider 7.

The piston 10b is slidably installed in the cylinder 10a. While the first fluid chamber 10d is formed on one side of the piston 10b, the second fluid chamber 10e is formed on the other side such that the volumes of the first and second fluid chambers vary as the piston 10b moves. The first and second fluid chambers are filled with a viscous fluid (for example, silicone oil).

The piston 10b is provided with a fluid conduit 10b' passing therethrough. When the piston 10b moves, the viscous fluid in the first fluid chamber 10d moves to the second fluid chamber 10e and vice versa. The flow rate regulating needle valve 10f serves to regulate the flow rate of the viscous fluid and adjust the energy absorption capability of the fluid damper 10. The position of the flow rate regulating needle valve 10f can be adjusted through a hole which is opened on the tip side of the abutment stem 10c.

Figure 3:
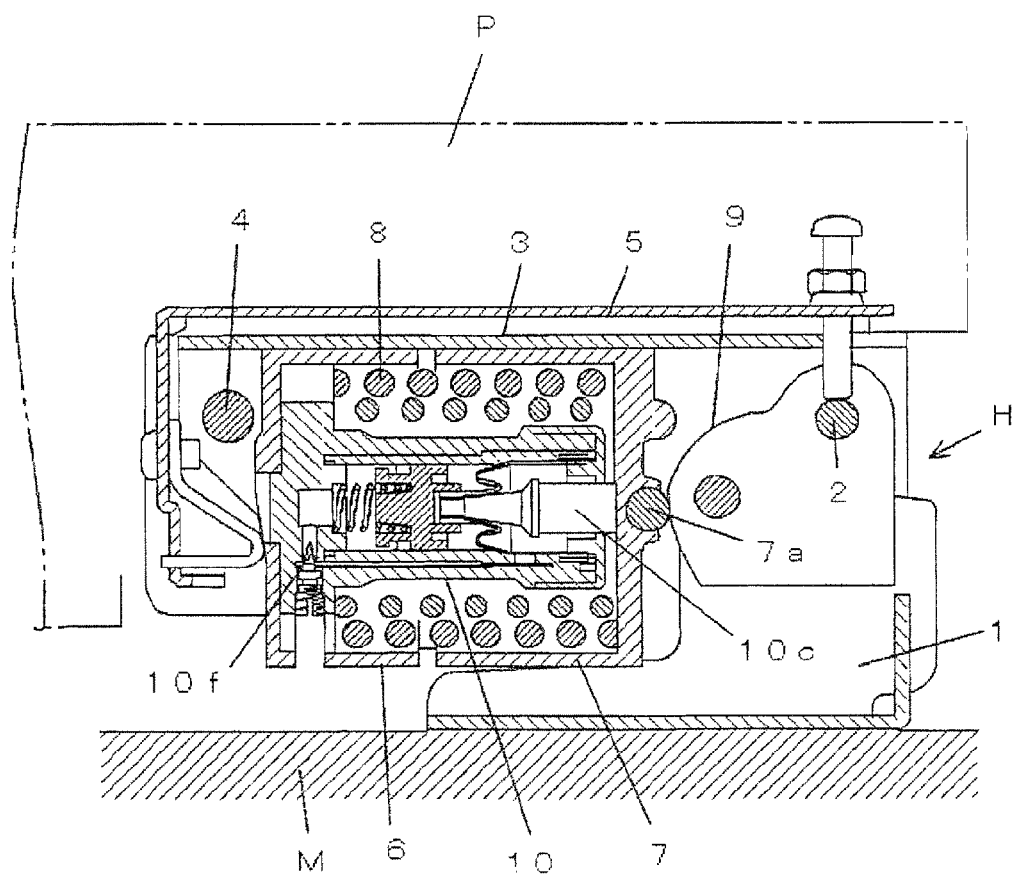
FIG. 3 is a view for explaining the action of the original cover closer shown in FIG. 1.
Figure 4A:
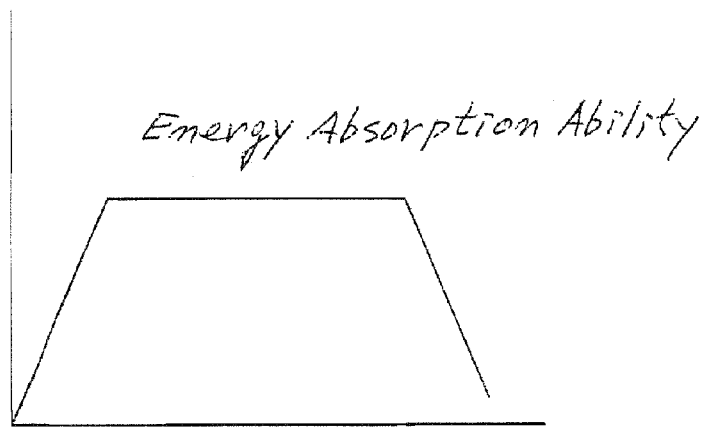
FIG. 4A is a graph showing the energy absorption capability of a prior art fluid damper.
Figure 4B:
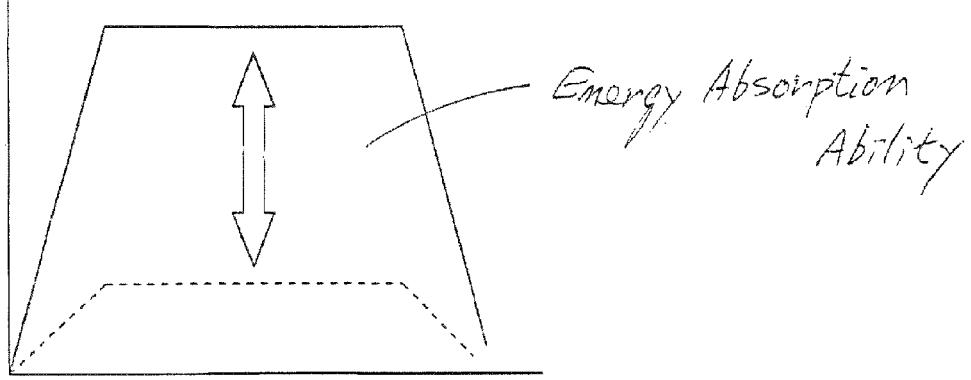
FIG. 4B is a graph showing the energy absorption capability of the fluid damper in accordance with the present invention.

In accordance with the cover closer of the present embodiment having the structure as described above, when the original cover P is closed from the position shown in FIG. 1 to the position shown in FIG. 3, the weight of the original cover P overcomes the repulsive force of the compression coil spring 8, and the original cover P rapidly moves in the downward direction so that the tip of the abutment stem 10c of the fluid damper 10 comes in contact with the second slider 7.

When the tip of the abutment stem 10c comes in contact with the second slider 7, the piston 10b which is integrally engaged with the abutment stem 10c is moved in the cylinder 10a toward the first fluid chamber 10d.

As the piston 10b is moved, the viscous fluid in the first fluid chamber 10d is transferred to the second fluid chamber 10e through the fluid conduit 10b' of the piston 10b. The moving speed of the piston 10b, which is in proportion to the energy absorption capability of the fluid damper 10, depends on the flow rate of the viscous fluid passing through the fluid conduit 10b'. The energy absorption capability can therefore be freely adjusted by changing the position of the flow rate regulating needle valve.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An original cover closer comprising:
   an attachment member to be mounted on the main body of a device;
   a support member pivotally connected to the attachment member and operable to support an original cover;
   a first and a second slider slidably installed in the support member;
   a compression coil spring interposed between the first and second sliders and operable to urge the original cover to open; and
   a fluid damper located in the compression coil spring, the fluid damper comprising:
      a cylinder having a base end fixed to the first slider;
      a piston slidably installed in the cylinder;
      an abutment stem integrally provided on the piston and located in order that a tip portion of the abutment stem can come in contact with the second slider;
      a first fluid chamber formed on one side of the piston;
      a second fluid chamber formed on the other side of the piston;
      a viscous fluid with which the first fluid second fluid chambers are filled;
      a fluid conduit formed through the piston in order that the viscous fluid can move through the fluid conduit from the first fluid chamber to the second fluid chamber and vice versa; and
      a flow rate regulating needle valve formed in the fluid conduit and operable to adjust the speed of the viscous fluid passing through the fluid conduit between the first fluid chamber and the second fluid chamber when the piston slides in the cylinder; and
   wherein the fluid conduit is formed to extend into the abutment stem, and the flow rate regulating needle valve is located in the abutment stem.

2. An original cover closer comprising:
   an attachment member to be mounted on the main body of a device;
   a support member pivotally connected to the attachment member and operable to support an original cover;
   a first and a second slider slidably installed in the support member;
   a compression coil spring interposed between the first and second sliders and operable to urge the original cover to open; and
   a fluid damper located in the compression coil spring, the fluid damper comprising:
      a cylinder having a base end fixed to the first slider;
      a piston slidably installed in the cylinder;
      an abutment stem integrally provided on the piston and located in order that a tip portion of the abutment stem can come in contact with the second slider;
      a first fluid chamber formed on one side of the piston;
      a second fluid chamber formed on the other side of the piston;
      a viscous fluid with which the first fluid second fluid chambers are filled;
      a fluid conduit formed through the piston in order that the viscous fluid can move through the fluid conduit from the first fluid chamber to the second fluid chamber and vice versa; and
      a flow rate regulating needle valve formed in the fluid conduit and operable to adjust the speed of the viscous fluid passing through the fluid conduit between the first fluid chamber and the second fluid chamber when the piston slides in the cylinder; and
   wherein the abutment stem is provided with an opening through which the position of the flow rate regulating needle valve can be adjusted.

* * * * *